United States Patent
Verma et al.

(10) Patent No.: US 6,522,880 B1
(45) Date of Patent: Feb. 18, 2003

(54) METHOD AND APPARATUS FOR HANDOFF OF A CONNECTION BETWEEN NETWORK DEVICES

(75) Inventors: Rohit Verma, Schaumburg, IL (US); Janakiraman Senthilnathan, Mount Prospect, IL (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/514,709

(22) Filed: Feb. 28, 2000

(51) Int. Cl.[7] ............................................. H04Q 7/20
(52) U.S. Cl. ................... 455/436; 455/437; 455/525; 370/331; 370/332
(58) Field of Search .......................... 456/436, 437, 456/410, 524, 525; 370/331, 332

(56) References Cited

U.S. PATENT DOCUMENTS

| | | | | |
|---|---|---|---|---|
| 5,528,595 A | | 6/1996 | Walsh et al. | 380/85.13 |
| 6,097,950 A | * | 8/2000 | Bertacchi | 455/432 |
| 6,415,151 B1 | * | 7/2002 | Kreppel | 455/445 |
| 6,445,911 B1 | * | 9/2002 | Chow et al. | 455/406 |
| 6,453,162 B1 | * | 9/2002 | Gentry | 455/433 |

OTHER PUBLICATIONS

C. Perkins, "*IP Mobility Support*", Network Working Group, RFC 2002, Oct. 1996, pp. 1–79.
W. Simpson, "*The Point–To–Point Protocol (PPP)* ", Network Working Group, RFC 1661, Jul. 1994, pp. i–52.
W. Simpson, "*PPP In HKLC–Like Framing*", Network Working Group, RFC 1662, Jul. 1994, pp. i–52.
D. Rand, "*PPP Reliable Transmission*", Network Working Group, RFC 1663, Jul. 1994, pp. 1–8.
W. Townsley et al., "*Layer Two Tunneling Protocol L2TP*", Network Working Group, RFC 2661, Aug. 1999, pp. 1–80.
S. Deering, "*Host Extensions For IP Multicasting*", Network Working Group, RFC 1112, Aug. 1989, pp. 1–17.
W. Fenner, "*Internet Group Management Protocol, Version 2*", Network Working Group, RFC 2236, Nov. 1997, pp. 1–24.

* cited by examiner

Primary Examiner—William Trost
Assistant Examiner—Eugene Yun
(74) Attorney, Agent, or Firm—McDonnell Boehnen Hulbert & Berghoff

(57) ABSTRACT

A method and system are shown for handing off a communication stream between a mobile node and a communication endpoint from a first connection initiator to a second connection initiator while maintaining call state for the communication stream. The first connection initiator establishes a first connection to the communication endpoint in response to receiving a first connection request from the mobile node that includes a client identifier value for the mobile node. When the first connection initiator detects loss of communication with the mobile node, it sends a call-disconnect-notify (CDN) message having a cause code set to a handoff value to the connection endpoint. The connection endpoint, in response to the CDN message, stores call information for the first connection along with the mobile node's client identifier value. The first connection initiator also broadcasts a user-moved message that includes the mobile node's client identifier value and the first connection initiator's call information for the first connection. The second connection initiator, upon receiving the user-moved message, stores the first connection initiator's call information from the message along with the mobile node's client identifier value. When the second connection initiator receives a second connection request from the mobile node having the mobile node's client identifier value, it retrieves the call information from the user-moved message using the client identifier value and sends a tunnel-handoff-request message, which includes the client identifier value, to the connection endpoint. The connection endpoint retrieves its call information for the first connection using the client identifier value and sends a tunnel-handoff-response message to the second connection initiator. The second connection initiator and the connection endpoint then resume the communication stream using the call information for the first connection.

18 Claims, 7 Drawing Sheets

METHOD AND APPARATUS FOR HANDOFF OF A CONNECTION BETWEEN NETWORK DEVICES

FIELD OF INVENTION

The present invention relates to data communications in mobile networks. More specifically, it relates to the hand over of a data connection from one cell to another without tearing down the data connection.

BACKGROUND OF THE INVENTION

The Internet Protocol ("IP") is an addressing protocol designed to route traffic within a network or between networks. The Internet Protocol is used on many computer networks including the Internet, intranets and other networks. Internet Protocol addresses are typically assigned to "immobile" nodes on a network and the IP address of each node is used to route datagrams to the node through a server connected to the node. An immobile node may be moved to a different server on the computer network, but is typically associated with a static physical location (e.g., 3Com Corporation in Santa Clara, Calif.).

In contrast, mobile nodes may connect to various physical locations on a computer network. A mobile node has its own network address and a semi-permanent relationship with a home agent or server to which the mobile node may occasionally be connected to send and receive datagrams. However, the mobile node can also connect to a foreign agent through which it sends and receives datagrams. An example of one protocol that facilitates communication with mobile nodes over the Internet is the Mobile Internet Protocol (Mobile IP), which allows "mobile" nodes to transparently move between different Internet Protocol sub-networks ("subnets"). Mobile IP is described in Request for Comment (RFC) 2002 IP Mobility Support, C. Perkins, October 1996, herein incorporated by reference, available from the Internet Engineering Task Force (IETF) at www.ietf.org.

Other protocols are also used to support mobile node communications. Often, protocols typically utilized in non-mobile applications, such as the Internet Protocol (IP) and the Point to Point protocol (PPP), are layered on top of a lower level mobile protocol, such as the Radio Frequency Link Protocol (RLP) defined by the International Telephone Union (ITU). However, the use of these non-mobile applications can create inefficiencies as mobile nodes move from one service area to another and connections are broken and reformed accordingly.

Internet Protocol addresses are typically assigned to mobile nodes based on their home Internet Protocol subnet. The home subnet is connected to an external network (e.g., the Internet or an intranet) with a "home agent" that serves as the subnet's gateway router. As is known in the art, the gateway connects computer networks using different networking protocols or operating at different transmission capacities. As is known in the art, a router translates differences between network protocols and routes data packets to an appropriate network node or network device. When a mobile node "roams," (i.e., dynamically changes its physical location), it periodically transmits "agent solicitation" messages to other gateway routers. A mobile node also listens for "agent advertisement" messages from other gateway routers. When a mobile node receives an agent advertisement message indicating that it is now on a foreign subnet, it registers with the foreign gateway router or "foreign agent" and its home agent. The registration with the home agent indicates that the mobile node is away from "home" (i.e., away from its home subnet). The registration with the foreign agent allows the mobile node to receive data on the foreign subnet.

Figure 1:
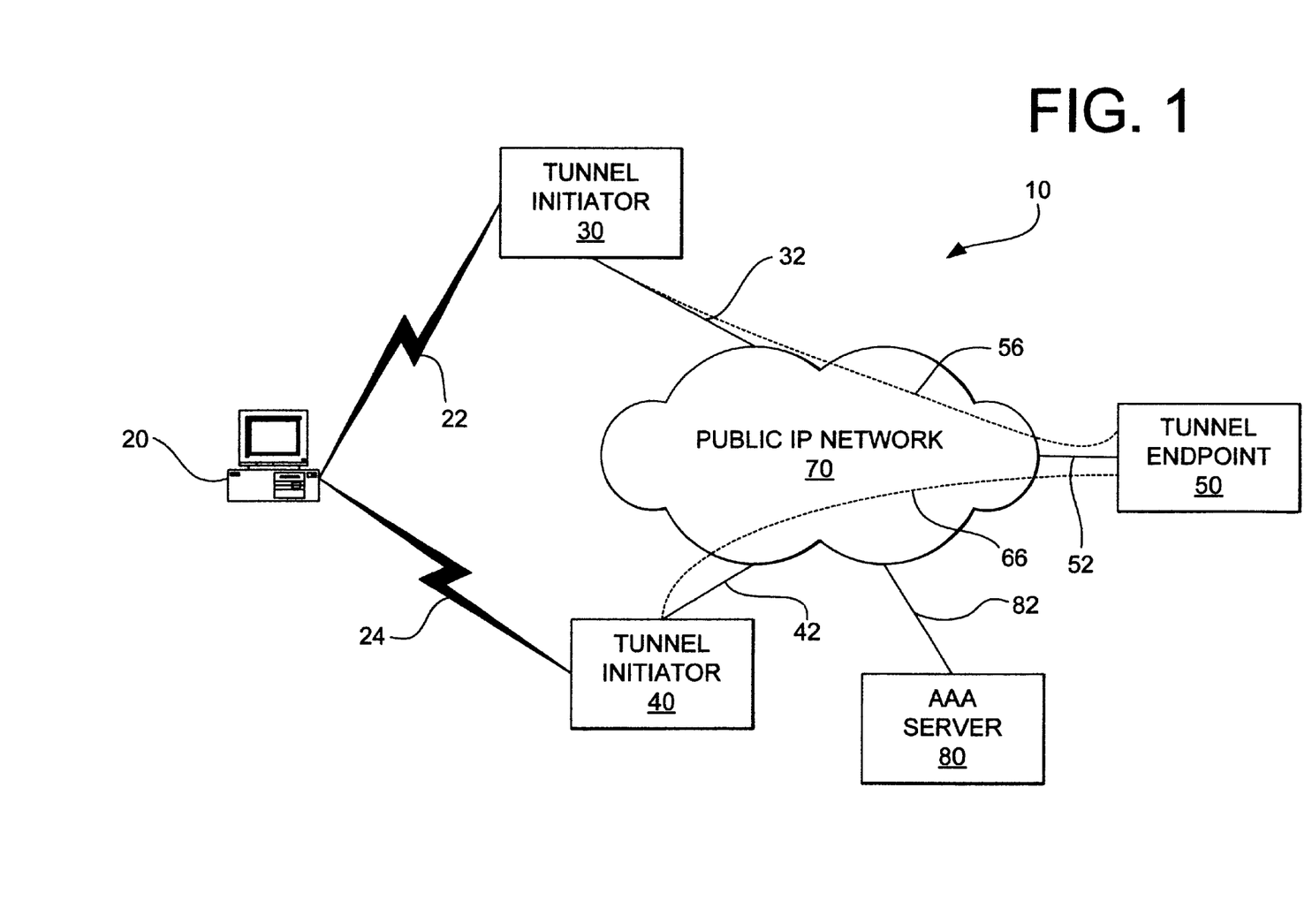
FIG. 1 is a functional block diagram illustrating an example of a conventional network architecture illustrating two separate connections for a mobile node that terminate on an endpoint device.

FIG. 1 shows an architecture 10 that illustrates an example of the connection of a mobile node 20 to public IP network 70. Public IP network 70 includes two foreign agents 30 and 40 that act as tunnel initiators responsive to the establishment of a link with mobile node 20. The network also includes a tunnel endpoint server 50 that is the home agent for mobile node 20 in this example.

When mobile node 20 receives an agent advertisement broadcast from tunnel initiator 30, the mobile node establishes a first link 22 with tunnel initiator 30. Link 22 is a radio frequency communication link between mobile node 20 and tunnel initiator 30. An example of a protocol for link 22 is the Radio Frequency Link Protocol (RLP). Tunnel initiator 30 is a foreign agent for mobile node 20 and, as part of establishing link 22, receives infonnation regarding a home agent from mobile node 20. Note that the information received by tunnel initiator 30 from mobile node 20 also includes the Mobile Identification Number (MIN) for mobile node 20. Using the mobile node's home agent information, tunnel initiator 30 establishes L2TP tunnel 56 to tunnel endpoint server 50, which is the home agent for mobile node 20.

One example of a tunnel initiator or endpoint device is a network access server, such as that described in the patent to Dale M. Walsh et al., U.S. Pat. No. 5,528,595, which is fully incorporated by reference herein and describes an integrated network access server suitable for use in the present invention. Such a device has been commercialized widely by 3Com Corporation (previously U.S. Robotics Corp.) under the trade designation Total Control™ Enterprise Network Hub. Network access servers similar in functionality, architecture and design are available from other companies, including Lucent Technologies and Cisco Systems. The invention is suitable for implementation in network access servers from the above companies, and in other similar devices.

In protocols that support client mobility, mobile node 20 typically senses that it has lost contact with tunnel initiator 30 when it times out waiting for an advertisement message from tunnel initiator 30. Mobile node 20 will then look for an advertisement message from a new foreign agent, such as tunnel initiator 40. When mobile node 20 receives an advertisement message from a foreign agent, tunnel initiator 40 in this case, it sends a registration message that initiates set-up of link 24 and set-up of tunnel connection 66. For further details relating to one example of how mobile nodes move from one foreign agent to another, see RFC 2002 regarding Mobile IP.

Registration of the mobile node 20 typically involves authentication, authorization and accounting (AAA). AAA server 80 interacts with foreign agents and other AAA servers, such as one connected to the mobile node's home network, to authorize, authenticate and perform accounting for the mobile client. To perform AAA services, the registration request from mobile node 20 to the tunnel initiator acting as the foreign agent will include a Network Access identifier (NAI), such as a Mobile Identification Number (MIN) or Electronic Serial Number (ESN), in an authentication extension of the r egistration request message. The tunnel initiator will forward the NAI to AAA server 80 that will perform the authentication and authorization, such as a Challenge and Accept Protocol (CHAP) or a cryptographic authentication. Mobility management may also be integrated with the AAA services in AAA server 80, wherein AAA server 80 helps manage registration of the mobile node and handoff of connections between foreign agents.

The AAA server 80 can also be configured to perform tunnel endpoint identification for mobile nodes. In this case, the tunnel initiator queries the AAA server 80 with the MIN supplied by the mobile node 20 to obtain an address for a tunnel endpoint for the connection. The AAA server 80 maintains a database containing entries that match MIN values with tunnel endpoint addresses. The AAA server 80 searches the database for an entry corresponding to the MIN value in the query from the tunnel initiator. The AAA server then returns the tunnel endpoint address from the corresponding entry in a reply message to the tunnel initiator.

The Radio Link Protocol, Code Division Multiple Access (CDMA) protocol, and other mobility protocols allow a mobile node to dynamically change its network connectivity in a manner that is transparent to protocol layers above the Internet Protocol layer. For example, without re-establishing Transmission Control Protocol or User Datagram Protocol sessions. As is known in the art, the Internet Protocol suite includes from lowest-to-highest, a link, network, transport and application layer. The Internet Protocol typically resides in the network layer in the Internet Protocol suite. Transmission Control Protocol and User Datagram Protocol typically reside in the transport layer of the Internet Protocol suite.

When a mobile node connects to a gateway on the Internet, a Point-to-Point Protocol (PPP) session is typically established between the mobile node and the gateway device. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference. The gateway, or tunnel initiator, typically initiates establishment of a tunnel connection to a tunnel endpoint server. For example, when a mobile node is connected to a foreign agent, a connection oriented point-to-point communication link, such as a Layer 2 Tunneling Protocol (L2TP) tunnel, is typically established between the foreign agent and the home agent to permit the transfer of data to and from the mobile node. See Layer Two Tunnelling Protocol (L2TP), Request for Comment (RFC) 2661, A. Valencia, et al., June 1999, herein incorporated by reference for all purposes.

Figure 2:
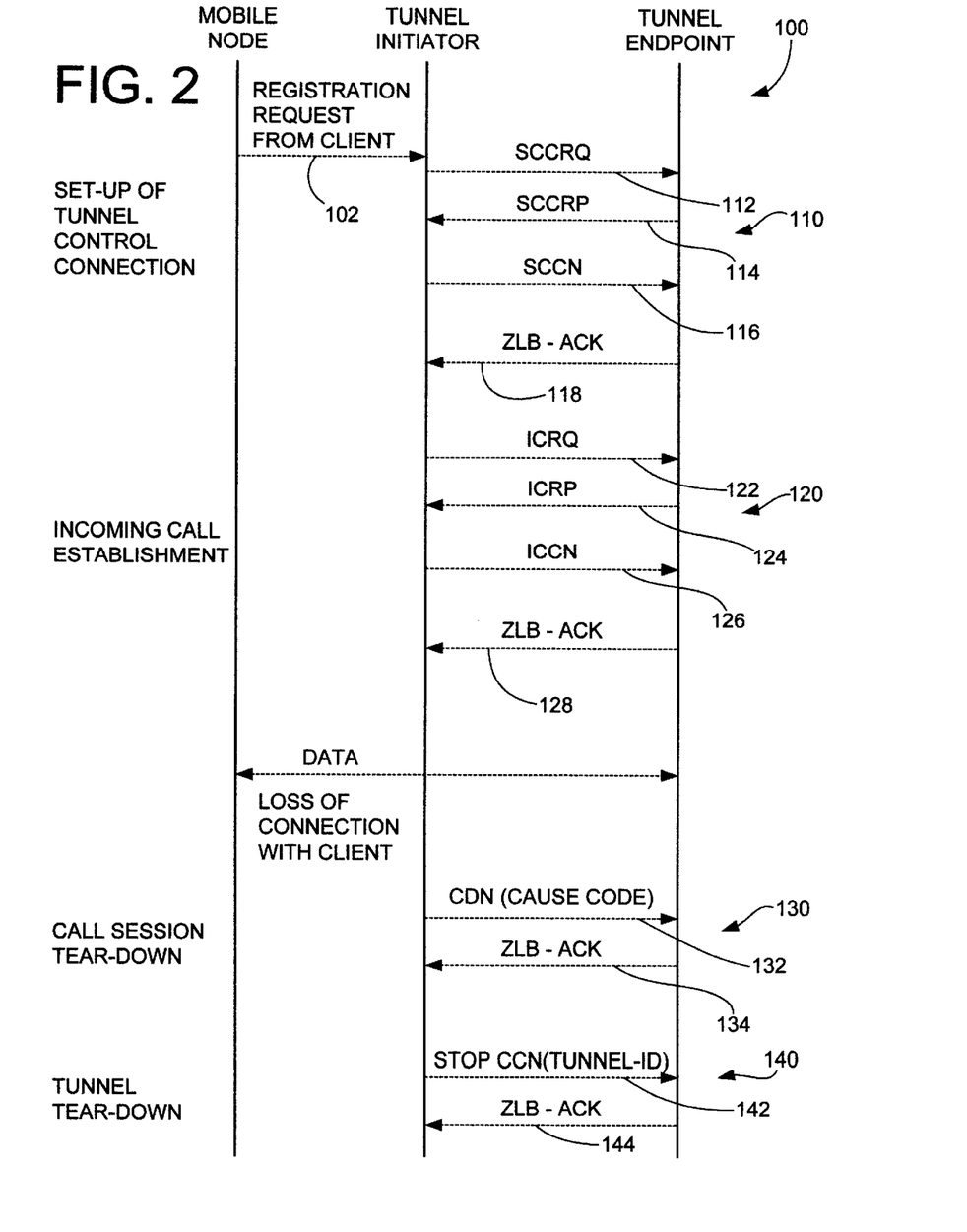
FIG. 2 is a message sequence scenario illustrating an example of conventional message traffic for setting up and tearing down the connections shown in FIG. 1.

FIG. 2 is a message flow diagram illustrating an example of a message exchange 100 that takes place with regard to a call session over an L2TP tunnel. When tunnel initiator 30 receives the registration request 102 from mobile node 20, it begins a tunnel control connection set-up exchange 110. Tunnel initiator 30 initiates tunnel set-up by sending a Start-Control-Connection-Request (SCCRQ) to tunnel endpoint 50. The SCCRQ message 112 will contain the tunnel ID value assigned by tunnel initiator 30 to the tunnel 56 being set-up.

Note that the IP address for tunnel endpoint 50 can be obtained in various ways. For instance, the MIN for mobile node 20 can be used to access a database containing the home agent address for the MIN value. Alternatively, the IP address for the home agent may be contained within the call request message 102 from the mobile node 20.

In response to the SCCRQ message 112, tunnel endpoint 50 sends a Start-Control-Connection-Reply (SCCRP) message 114. Tunnel initiator then sends a Start-Control-Connection-Connected (SCCN) message 116. At this point, the control connection for tunnel connection 56 is established. If no messages for mobile node 20 are waiting in the queue at tunnel endpoint 50, then a Zero-Length-Body (ZLB) acknowledge message 118 is sent to tunnel initiator 30.

Next, a call session is established for the call originated by mobile node 20. The tunnel initiator assigns a session ID value to each call session in order to discriminate between streams on tunnel 56. Each call session corresponds to a single PPP stream between the tunnel initiator and the tunnel endpoint. An incoming call establishment message sequence begins with tunnel initiator 30 sending an Incoming-Call-Request (ICRQ) message 122 to tunnel endpoint 50 that includes a call session ID assigned by tunnel initiator 30. Tunnel endpoint 50 responds with an Incoming-Call-Reply (ICRP) message 124 to tunnel initiator 30, which, in turn, sends an Incoming-Call-Connected (ICCN) message 126 to tunnel endpoint 50. If no messages for mobile node 20 are waiting in the queue at tunnel endpoint 50, then a Zero-Length-Body (ZLB) acknowledge message 128 is sent to tunnel initiator 30.

A tunnel between tunnel initiator 30, the current foreign agent for mobile node 20, and tunnel endpoint 50, the home agent for mobile node 20, is now in place with a call session for mobile node 20. Each data and control packet will contain the tunnel ID and call session ID assigned by the tunnel initiator 30 to differentiate these packets from those of other tunnels and calls that may exist between the tunnel initiator 30 and tunnel endpoint 50.

Figure 3:
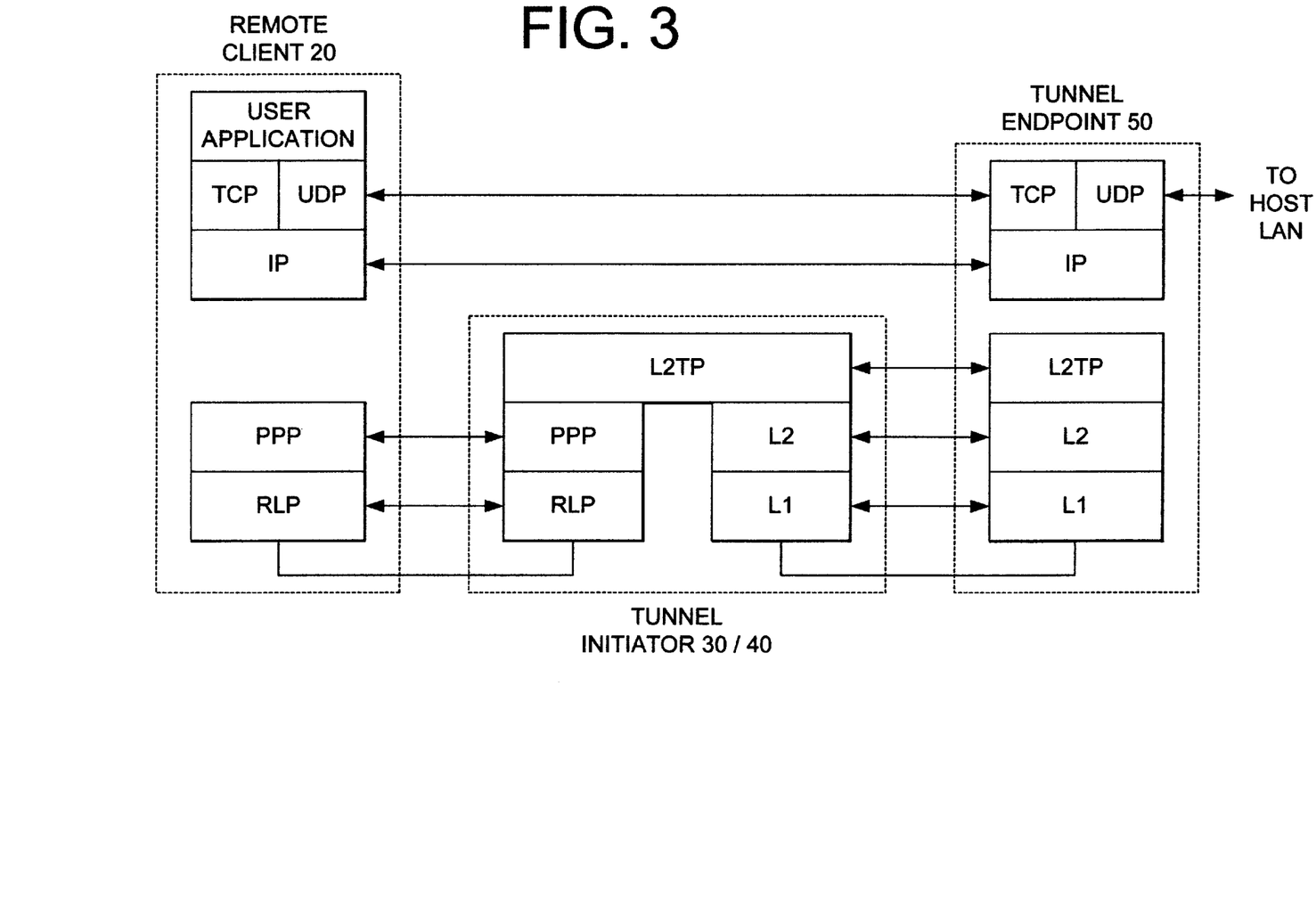
FIG. 3 is a protocol stack diagram illustrating an example of the conventional protocol stacks in the remote client, tunnel initiators and tunnel endpoint of FIG. 1.

FIG. 3 is a protocol stack diagram illustrating an example of the protocol relationships in a conventional tunnel structure. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets. FIG. 3 illustrates an example of protocol stacks in each of the remote client 20, tunnel initiators 30 and 40, and tunnel endpoint 50 of FIG. 1. Links 22 and 24 for remote client 20 to tunnel initiators 30 and 40, respectively, involve a wireless link protocol, such as RLP. Thus, an RLP to RLP session is represented at layer 1 of the protocol stacks in FIG. 2 between remote client 20 and tunnel initiator 30/40. Because the physical link provided by RLP in this example is a serial link, a serial data link protocol session, such as the point-to-point protocol (PPP), exists between remote client 20 and tunnel initiator 30/40. PPP is described in further detail in RFC 1661 herein incorporated by reference for all purposes.

When a tunnel is established from tunnel initiator 30/40 to tunnel endpoint 50, there are layer 1 (L1) and layer 2 (L2) sessions between the tunnel servers as well as a L2TP session that represents the tunnel itself. Once the tunnel connection is established, a session between network layer peers, such as internet protocol (IP) peers, in the remote client 20 and tunnel endpoint 50 typically exists as well as a session between transport layer peers. Transport layer protocols such as Transmission Control Protocol ("TCP") and User Datagram Protocol ("UDP") are often used over IP in computer networks. The Transmission Control Protocol provides a connection-oriented, end-to-end reliable protocol designed to fit into a layered hierarchy of protocols that support multi-network applications. The User Datagram Protocol provides a transaction oriented datagram protocol, where delivery and duplicate packet protection are not guaranteed.

Returning to FIG. 1, as mobile node 20 roams, it may leave the broadcast area, or service area, for tunnel initiator 30 thereby breaking link 22. Tunnel initiator 30 typically detects the loss of link 22 by timing out waiting for a transmission from mobile node 20. When tunnel initiator 30 detects loss of the connection 22 to mobile node 20, it will tear-down the call session and to tunnel endpoint 50 and, if no other call sessions are active over the tunnel 56, will tear-down the tunnel itself.

Returning to FIG. 2, a call session tear-down sequence 130 begins with tunnel initiator 30 sending a Call-Disconnect-Notify (CDN) message 132 to tunnel endpoint 50. The CDN message includes the call session ID for the call corresponding to mobile node 20. The CDN message may also include an Attribute Value Pair (AVP) consisting of a Q.931 Cause Code that indicates the reason for the disconnection. Q.931 is a message oriented signaling protocol defined by the International Telecommunication Union (ITU), as set forth in ITU-T Recommendation 1.451. Tunnel endpoint 50 responds with ZLB-ACK message 134 and removes the call status data relating to the call session ID from its call status table.

When tunnel 56 is torn-down, a tunnel tear-down sequence 140 begins with tunnel initiator 30 sending a Stop-Control-Connection-Notify (StopCCN) message 142 to tunnel endpoint 50. The StopCCN message includes the tunnel ID value for the tunnel. Tunnel endpoint 50 responds with ZLB-ACK message 144 and removes the tunnel status data relating to the tunnel ID value from it tunnel status table.

Returning to FIG. 1, mobile node 20 will detect an agent advertisement from a new agent in the broadcast area where mobile node 20 currently resides. Mobile node 20 will establish a new communication link 24 with the new agent, which in this example is tunnel initiator 40. Tunnel initiator 40 will then establish a new tunnel 66 and call session to tunnel endpoint 50 in the manner described above with regard to tunnel initiator 30.

When the remote client 20 moves out of the service area for tunnel initiator 30 and into the service area for tunnel initiator 40, the PPP session from the remote client to tunnel initiator 30 is lost when communication over link 22 is lost. When link 24 is established, a new PPP session between PPP peers in the stacks of remote client 20 and tunnel initiator 40 must be reestablished. However, when a new PPP session is started for the new link, state information regarding the connection is lost, which is relatively unimportant in voice connections but can result in significant disruption of data connections.

Thus, the need remains for an efficient method for handing off a tunnel connection between a remote client and a server.

SUMMARY OF THE INVENTION

In accordance with preferred embodiments of the present invention, some of the problems associated with handing off a tunnel connection are overcome.

An embodiment of a method for handing off a communication stream in a communications system, according to the present invention, involves receiving a first connection request from a client, where the first connection request includes a client identifier value for the client and, responsive to the first connection request, establishing a first connection from a first connection initiator to a connection endpoint. The method also calls for sensing loss of communication between the client and the first connection initiator and, responsive thereto, transmitting a disconnect message to the connection endpoint, where the disconnect message includes a predetermined handoff code. Responsive to receiving the disconnect message having the handoff code, the method sets forth storing a first set of call information for the first connection from the connection endpoint along with the client identifier value and broadcasting a user moved message from the first connection initiator, where the user moved message includes the client identifier value and a second set of call information for the first connection from the first connection initiator. The method also includes receiving the user moved message in a second connection initiator and, responsive thereto, storing the second set of call information included with the user moved message along with the client identifier value. The method then sets forth receiving a second connection request from the client at the second connection initiator, where the second connection request includes the client identifier value, retrieving the second set of call information using the identifier value for the client, and sending a handoff request message to the connection endpoint, where the handoff request message includes the client identifier value from the second connection request. Responsive to the handoff request message, the method calls for retrieving the first set of call information from using the identifier value for the client and establishing a second connection from the second connection initiator, where the second initiator uses the second set of call information, to the connection endpoint, where the connection endpoint uses the first set of call information.

An embodiment of a network communication system, according to the present invention, includes a first connection initiator device coupled to a network. The first connection initiator has a first network address and is configured to communicate with a mobile client broadcasting within a first service area of the first connection initiator. The first connection initiator is further configured to receive a first connection request from the mobile client that includes a client identifier value for the mobile client and, responsive to the first connection request, obtain a second network address corresponding to the client identifier value, and establish a first connection between the first and second network addresses. The first connection initiator is also configured to detect that the mobile client has left the first service area and, responsive thereto, transmit a disconnect message having a predetermined handoff code to the second network address and transmit a user moved message to a predetermined network broadcast address, where the user moved message includes a first set of call state information from the first connection initiator that pertains to the first connection. The network system also includes a connection endpoint device that is coupled to the network, has the second network address, and is configured to establish the first connection between the first and second network addresses. The connection endpoint is further configured to receive the disconnect message having the predetermined handoff code and, responsive thereto, store a second set of call state information from the connection endpoint that pertains to the first connection along with the client identifier value. The connection endpoint is still further configured to receive a handoff request message from a third network address, where the handoff request message contains the client identifier value, and, responsive thereto, retrieve the second set of call state information and establish a second connection between the second and third network addresses using the second set of call state information. And finally, the network system includes a second connection initiator device coupled to the network, having the third network address. The second connection initiator device is configured to receive the user moved message transmitted to the predetermined network broadcast address and store the first set of call state information along with the client identifier value. The second connection initiator is also configured to communicate with the mobile client broadcasting within a second service area of the second connection initiator and receive a second connection request from the mobile client that includes the client identifier value. Responsive to the second connection request, the second connection initiator is further configured to retrieve the first set of call state information, send the tunnel handoff request message to the second network address, and establish the second connection between the second and third network addresses using the first set of call state information.

The foregoing and other features and advantages of a preferred embodiment of the present invention will be more readily apparent from the following detailed description, which proceeds with references to the accompanying drawings.

BRIEF DESCRIPTION OF THE DRAWINGS

The present invention is described in the context of an embodiment of the invention with reference to the following drawings, wherein.

DETAILED DESCRIPTION OF PREFERRED EMBODIMENTS

The present invention is directed toward a method and system for handing off a tunnel connection.

Figure 4:
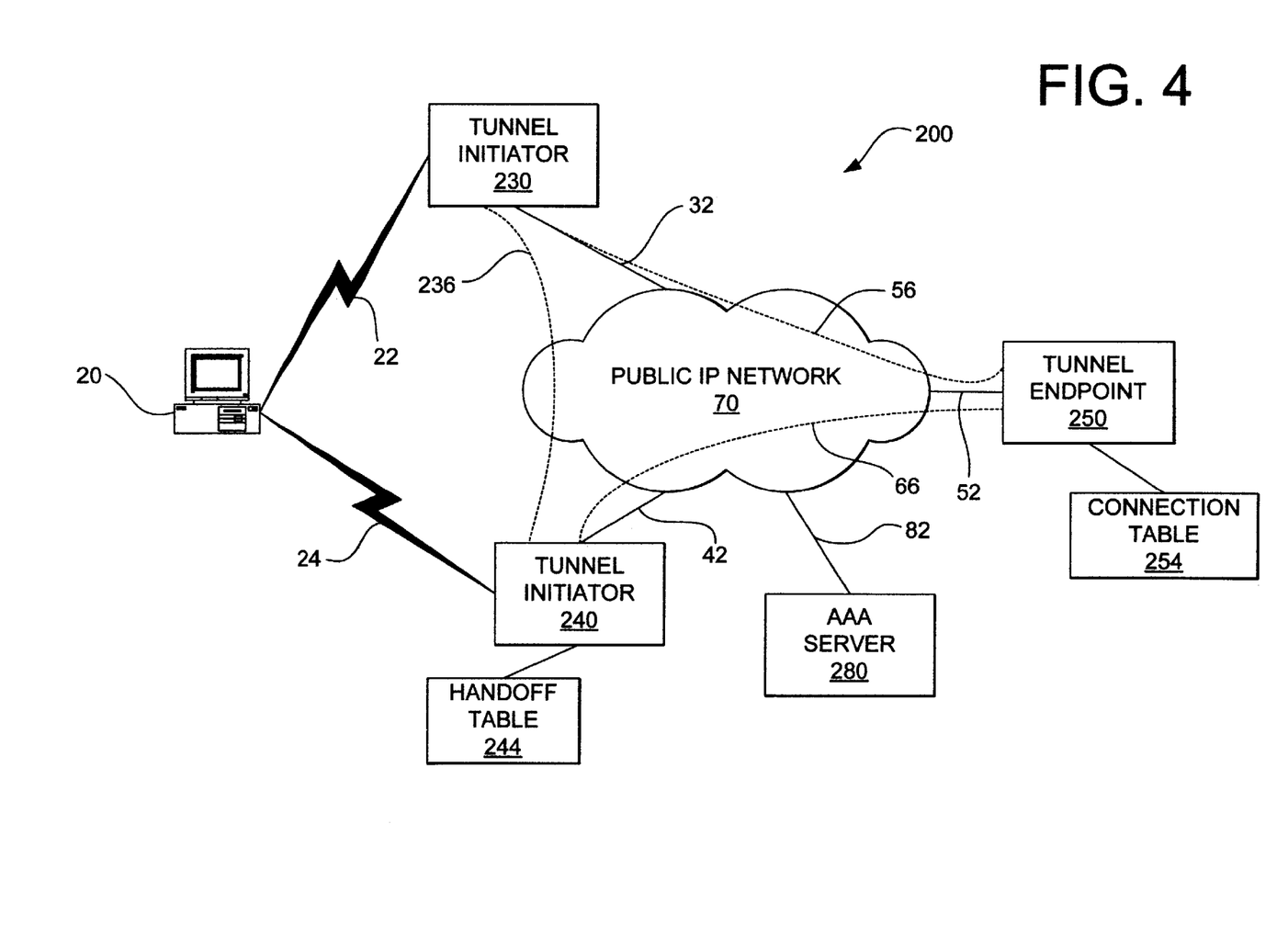
FIG. 4 is a functional block diagram of an exemplary embodiment of a network architecture according to the present invention illustrating the transition of a connection for a mobile node from a first tunnel initiator to a second tunnel initiator.

FIG. 4 is a block diagram illustrating one embodiment of network architecture 200 according to the present invention. Architecture 200 includes tunnel initiators 230 and 240, tunnel endpoint 250 and AAA server 80 connected to public IP network 70. Each of tunnel initiators 230 and 240 are capable of establishing a link 22 and 24, respectively, with mobile node 20.

Each of the tunnel initiators is also capable of establishing a tunnel connection 56 and 66, respectively, with tunnel endpoint 250 in the manner described above with respect to tunnel initiators 30 and 40 of FIG. 1. When tunnel initiator 230 receives a registration request from mobile node 20 over link 22, it sets up a tunnel connection to tunnel endpoint 250, as described in the tunnel set-up sequence 110 and the call establishment sequence 120 of FIG. 2.

Figure 5:
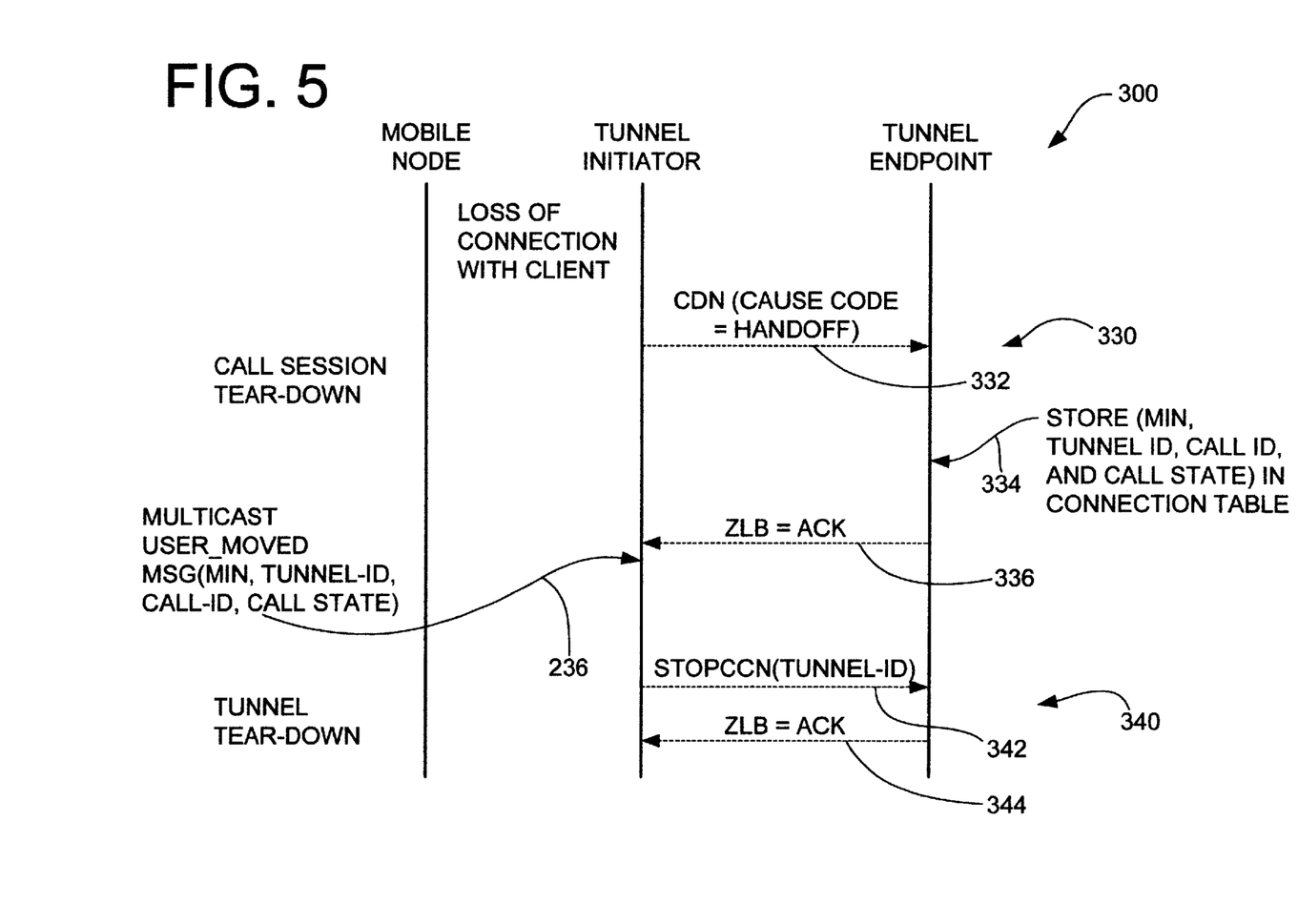
FIG. 5 is a message sequence scenario illustrating an example of message traffic according to an embodiment of the present invention when the mobile node of FIG. 4 leaves a service area of the first tunnel initiator.

However, when a hand-off of remote client 20 from one tunnel initiator, i.e. tunnel initiator 230, to another tunnel initiator, i.e. tunnel initiator 240, occurs, then a call session tear-down event 300 according to the present invention, as shown in FIG. 5, will take place. In an embodiment of a call session tear-down sequence 330, when tunnel initiator 230, according to the present invention, detects the loss of the connection 22 with mobile node client 20, it sends CDN message 332 with a newly defined cause code value of HANDOFF to tunnel endpoint 250. Responsive to CDN message 332, tunnel endpoint 250 creates an entry in connection table 254 that includes the MIN for the mobile node, the tunnel ID value assigned to connection 56 by tunnel initiator 230, the call ID value assigned to connection 56 by tunnel initiator 230, and call state data for connection 56.

The call state data can take a variety of forms. For instance, in a data connection, the call state data may include the sequence number of the last packet sent, Ns, and the sequence number of the last packet received, Nr, for connection 56. See RFC 2661. In a voice connection, the call state may include whether the mobile node has a call waiting or is part of a conference call. The call state data may also include call state data relating to the PPP protocol or other connection oriented protocols. For instance, tunnel endpoint 250 may store the call state data for a virtual PPP session with a peer entity in remote client 20. See RFC 1661. One of ordinary skill in the art will recognize that a variety of types of call state data exist that may be advantageously preserved by applying the approach described in the present invention.

Tunnel initiator 230 will also multicast a newly defined USER_MOVED message, shown as message 236 in FIG. 3, that also includes the MIN for the mobile node, the tunnel ID value assigned to connection 56 by tunnel initiator 230, the call ID value assigned to connection 56 by tunnel initiator 230, and call state data for connection 56. The message may also include the address for tunnel endpoint 250.

An IP multicast message will have a predetermined message type that uniquely identifies it as a database query in accordance with the present invention. IP multicasting is the transmission of an IP datagram to a "host group", a set of zero or more hosts identified by a single IP destination address. A multicast datagram is delivered to all members of its destination host group with the same "best-efforts" reliability as regular unicast IP datagrams, i.e., the datagram is not guaranteed to arrive intact at all members of the destination group or in the same order relative to other datagrams. The membership of a host group is dynamic; that is, hosts may join and leave groups at any time. There is no restriction on the location or number of members in a host group. A host may be a member of more than one group at a time and a host need not be a member of a group to send datagrams to it.

A host group may be permanent or transient. A permanent group has a well-known, administratively assigned IP address. It is the address, not the membership of the group, that is permanent; at any time a permanent group may have any number of members, even zero. Those IP multicast addresses that are not reserved for permanent groups are available for dynamic assignment to transient groups which exist only as long as they have members. See RFC 1112 and RFC 2236 for further information regarding IP multicasting.

After multicasting message 236, tunnel initiator 230 then sends a StopCCN message 342 containing the tunnel ID for connection 56, which is acknowledged by tunnel endpoint 250 with ZLB-ACK message 344. However, tunnel initiator 250 has stored the information relating to connection 56 in the entry in the connection table 254, so connection 56, in effect, survives in a suspended state.

The multicast message 236 is sent to a predetermined multicast address that is shared by all the tunnel initiators within a subnet that includes tunnel initiator 230. There is typically some correlation between the logical subnet of tunnel initiator 230 and the geographical area surrounding tunnel initiator 230 within which mobile node 20 is likely to be travelling. For purposes of the present example, tunnel initiator 240 shares the subnet with tunnel initiator 230 and will therefore receive USER_MOVED message 236.

When tunnel initiator 240 receives the USER_MOVED message 236, it creates an entry in handoff table 244 that is keyed by the MIN value and includes the data from the message. Likewise, all other tunnel initiators that receive message 236 and are configured according to the present invention will create an entry in their corresponding handoff tables.

Figure 6:
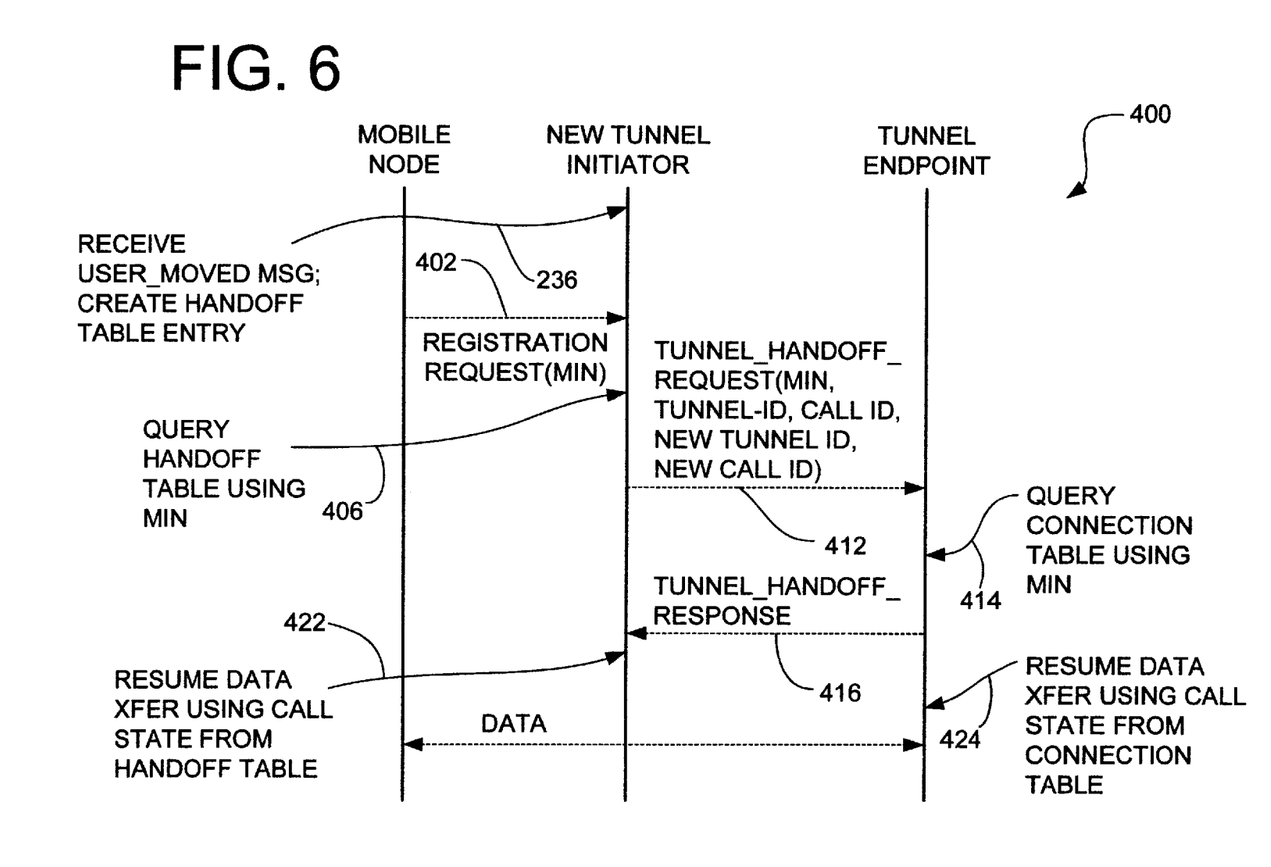
FIG. 6 is a message sequence scenario illustrating an example of message traffic according to an embodiment of the present invention when the mobile node of FIG. 4 enters a service area of the second tunnel initiator.

When mobile node 20 enters the service area for tunnel initiator 240 and receives an agent advertisement from tunnel initiator 240, it will transmit registration request 402 that includes its MIN value. Responsive to registration request 402, tunnel initiator 240 will query handoff table 244 using the MIN value. Tunnel initiator 240 will find the entry for mobile node 20 that was created in response to message 236 and sends a newly defined TUNNEL_HANDOFF_REQUEST message 412 that includes the MIN value, the tunnel ID value assigned to connection 56 by tunnel initiator 230, the call ID value assigned to connection 56 by tunnel initiator 230, a new tunnel ID value assigned to connection 66 by tunnel initiator 240, and a new call ID value assigned to connection 66 by tunncl initiator 240.

Tunnel endpoint 250 uses the MIN value from tunnel handoff message 412 to query connection table 254 for a corresponding entry and will find the entry created in response to the CDN message 332 in FIG. 4 having cause code=HANDOFF. Tunnel endpoint 250 restores the call data information from the entry in connection table 254 for use with connection 66 established with tunnel initiator 240. Tunnel endpoint acknowledges tunnel handoff message 412 by sending TUNNEL_HANDOFF_RESPONSE message 416.

Once ZLB-ACK message 416 is received in the new tunnel initiator 240, the status of connection 66 is substantially the same as the call state of connection 56 when data transfer over connection 56 ceased. With the call state for connection 56 established in tunnel initiator 240 and restored in tunnel endpoint 250, data transfer over connection 66 may resume where it left off when mobile node 20 left the transmission area for tunnel initiator 230.

Figure 7:
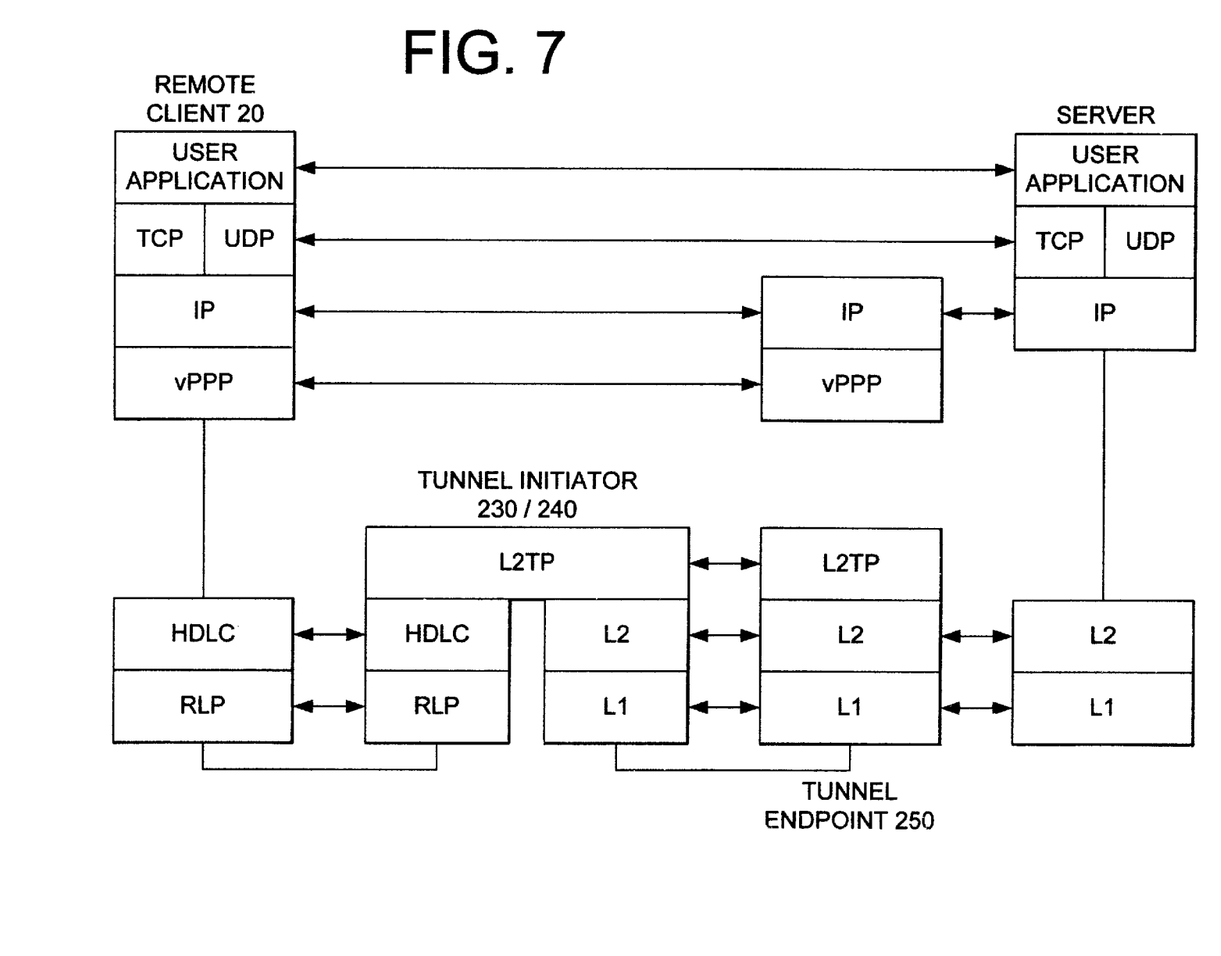
FIG. 7 is a protocol stack diagram illustrating an example of the protocol stacks in the remote client, tunnel initiators and tunnel endpoint of FIG. 4.

FIG. 7 is a protocol stack diagram illustrating one embodiment of the protocol peer relationships between the remote client 20 and the tunnel initiators 230/240 and tunnel endpoint 250, according to the present invention, as well as the peer relationships to a server connected to tunnel initiator 250. A virtual PPP (vPPP) session is established between peer protocol entities in remote client 20 and tunnel endpoint 250. A connection between the remote client and tunnel initiator 230 or 240 involves a high-level data link control (HDLC) session on top of an RLP link.

HDLC is a part of PPP that performs framing for packets over the data link and is stateless. Each time the remote client 20 moves from the service area of one tunnel initiator server to another, RLP establishes a link and passes packets up to HDLC for framing. Because HDLC is relatively stateless, the connection set-up between the HDLC peers in the client and tunnel initiator is minimal. In the approach of the present invention, as described above, the call state for the vPPP session is maintained in the remote client 20 and the tunnel endpoint 250 independent of the link connection between the remote client 20 and the tunnel initiators 230/240. Thus, data transfer over the tunnel between the remote client 20 and tunnel endpoint 250 can resume where transmission left off using the call state stored for the tunnel in tunnel endpoint 250.

When the remote client 20 moves from the service area of one tunnel initiator server to another, a control session within RLP passes an identifier value for the remote client, such as the MIN, up to a L2TP peer within the tunnel initiator 230 or 240. The L2TP peer in the tunnel initiator is modified, in accordance with the present invention, to search a table for the tunnel information relating to the remote client and reestablish the tunnel connection from the new tunnel initiator to the tunnel endpoint. Meanwhile, the transitions from one tunnel initiator to another remain invisible to the user application peers in remote client 20 and the server connected to tunnel endpoint 250 that are transferring data over the tunnel connection.

Note that while the embodiment of FIG. 4 shows the handoff message 236 being received and stored in tunnel initiator 240, the message may be received and its information stored elsewhere, such as in the AAA server 280. In this embodiment, an authentication query from a tunnel initiator in response to a mobile node's registration request will result in the AAA server 280 returning the call information from the handoff message 236. One of ordinary skill in the art will appreciate that the message and data exchange illustrated in the preferred embodiment may be altered without departing from the spirit of the present invention. The use of IP multicasting permits the location of call data contained within handoff message 236 to be transparent to the protocol according to the present invention since the multicast message is universally broadcast and will therefore be received by a the server for storage in a handoff table, such as handoff table 244, regardless of where the table is located. Also, multicasting allows the handoff table to be distributed across multiple server devices, since multicasting provides for the handling of multiple replies to a niulticast message by discarding extraneous replies.

Tear-down of connections and clean up of entries in handoff table 244 and connection table 254 can occur in a variety of ways. Table entries for connections may include a timestamp that provides for entries to be removed from the tables after a pre-determined time period. Table entries may also be removed responsive to a tear-down message from the tunnel initiators or tunnel endpoint or, in the case of mobile IP, through a de-registration message. In the latter case, the message will include a tear-down message type along with an identifier for the table entry, such as the MIN value.

Although the present invention is described generally in the context of an L2TP tunnel and a mobile connection, the present invention is applicable to any communications link where it is desirable to transition a communication stream between connections from multiple origins to an endpoint.

It should be understood that the programs, processes, methods, systems and apparatus described herein are not related or limited to any particular type of computer apparatus (hardware or software), unless indicated otherwise. Various types of general purpose or specialized computer apparatus may be used along with the present invention or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the messages of the message flow scenarios may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A method for handing off a communication stream in a communications system, the method comprising the steps of:

receiving a first connection request from a client, where the first connection request includes a client identifier value for the client;

responsive to the first connection request, establishing a first connection from a first connection initiator to a connection endpoint;

sensing loss of communication between the client and the first connection initiator and, responsive thereto, transmitting a disconnect message to the connection endpoint, where the disconnect message includes a predetermined handoff code;

responsive to receiving the disconnect message having the handoff code, storing a first set of call information for the first connection from the connection endpoint along with the client identifier value;

broadcasting a user moved message from the first connection initiator, where the user moved message includes the client identifier value and a second set of call information for the first connection from the first connection initiator;

receiving the user moved message in a second connection initiator and, responsive thereto, storing the second set of call information included with the user moved message along with the client identifier value;

receiving a second connection request from the client at the second connection initiator, where the second connection request includes the client identifier value;

retrieving the second set of call information using the identifier value for the client;

sending a handoff request message to the connection endpoint, where the handoff request message includes the client identifier value from the second connection request;

responsive to the handoff request message, retrieving the first set of call information from using the identifier value for the client; and establishing a second connection from the second connection initiator, where the second initiator uses the second set of call information, to the connection endpoint, where the connection endpoint uses the first set of call information.

2. The method of claim 1, where the step of retrieving the second set of call information includes querying a database local to the second connection initiator.

3. The method of claim 1, where the step of retrieving the second set of call information includes querying a database remote from the second connection initiator.

4. The method of claim 3, where the database is accessed through an Authentication, Authorization and Accounting (AAA) server.

5. The method of claim 1, where the client identifier value is a Mobile Identification Number (MIN).

6. The method of claim 1, where the step of broadcasting a user moved message further comprises multicasting the user moved message to a predetermined group address.

7. The method of claim 1, where the first set of call information comprises call state information from the connection endpoint for the first connection and the second set of call information comprises call state information from the first connection initiator for the first connection.

8. The method of claim 7, where the call state information from the connection endpoint and the call state information from the first connection initiator each include a number of packets sent parameter and a number of packets received parameter.

9. A computer readable medium having stored therein instructions for causing a central processing unit to execute the method of claim 1.

10. A network communication system, the system comprising:

a first connection initiator device coupled to a network, having a first network address, and configured to communicate with a mobile client broadcasting within a first service area of the first connection initiator, the first connection initiator being further configured to receive a first connection request from the mobile client that includes a client identifier value for the mobile client and, responsive to the first connection request, obtain a second network address corresponding to the client identifier value and establish a first connection between the first and second network addresses, the first connection initiator being further configured to detect that the mobile client has left the first service area and, responsive thereto, transmit a disconnect message having a predetermined handoff code to the second network address and transmit a user moved message to a predetermined network broadcast address, where the user moved message includes a first set of call state information from the first connection initiator that pertains to the first connection;

a connection endpoint device coupled to the network, having the second network address, and configured to establish the first connection between the first and second network addresses, the connection endpoint being further configured to receive the disconnect message having the predetermined handoff code and, responsive thereto, store a second set of call state information from the connection endpoint that pertains to the first connection along with the client identifier value, and the connection endpoint being still further configured to receive a handoff request message from a third network address, where the handoff request message contains the client identifier value, and, responsive thereto, retrieve the second set of call state information and establish a second connection between the second and third network addresses using the second set of call state information; and a second connection initiator device coupled to the network, having the third network address, the second connection initiator being configured to receive the user moved message transmitted to the predetermined network broadcast address and store the first set of call state information along with the client identifier value, the second connection initiator being further configured to communicate with the mobile client broadcasting within a second service area of the second connection initiator, receive a second connection request from the mobile client that includes the client identifier value, and, responsive thereto, retrieve the first set of call state information, send the tunnel handoff request message to the second network address, and establish the second connection between the second and third network addresses using the first set of call state information.

11. The network communication system of claim 10, where the first network initiator device is further configured to obtain the second network address corresponding to the client identifier value by querying a database using the client identifier value.

12. The network communication system of claim 11, where the database is local to the first network initiator device.

13. The network communication system of claim 12, where the database is accessible through a AAA server coupled to the network.

14. The network communication system of claim 10, where the client identifier value further comprises a Mobile Identification Number (MIN).

15. The network communication system of claim 10, where the predetermined network broadcast address further comprises a multicast address associated with all devices coupled to a subnetwork of the network, where the first and second connection initiator devices are both coupled to the subnetwork.

16. The network communication system of claim 10, where the first and second sets of call state information each include a number of packets sent parameter and a number of packets received parameter.

17. The network communication system of claim 10, where the first and second sets of call state information each include the second network address.

18. The network communication system of claim 10, where the first and second connections each further comprise a point-to-point connection.

* * * * *